Dec. 22, 1964 W. T. CANAN 3,162,191

ORAL EXAMINER

Filed Nov. 13, 1962

INVENTOR
Walter T. Canan 3,162,191
ORAL EXAMINER
Walter T. Canan, 2518 E. Huntington Drive,
Duarte, Calif.
Filed Nov. 13, 1962, Ser. No. 236,909
9 Claims. (Cl. 128—15)

This invention relates to surgical instruments and particularly to an oral examiner for inspecting the throat and mouth of a patient.

Hitherto, standard types of instruments serving the purpose of laryngeal inspection have consisted of a small mirror mounted at the end of a rigid handle usually made of metal. Devices of this sort are normally used for inspection of the upper trachea.

In Patent No. 2,653,597, issued September 29, 1953, to applicant, there was described a tongue depressor comprising essentially an elongated substantially flat strip of plastic, with a recess at one end and a translucent mirror having opposite reflecting surfaces located in the recess. The present invention is in certain aspects related to the tongue depressor disclosed in this patent but has additional advantages and function that are impossible of achievement with the instrument described in this patent.

A primary object of the present invention is the provision of an instrument for use by the medical professions that will in a single device unite and correlate the functions of a tongue depressor, a retractor, and a laryngeal mirror.

Another object of the present invention is to provide a more versatile instrument than hitherto has been available, and one that is better adapted to the needs of the profession than presently available instruments.

A correlary object of the invention is the provision of an instrument of the above type that is readily manipulatable.

A further object of the invention is the provision of an oral examiner that is inexpensive and that may be discarded if desired after one use; thus obviating necessity for repeated sterilization.

Another object is the provision of an instrument that will be light in weight, flexible, and/or resilient, that will have a conformation that is adapted for performing its several functions and that can be packed in assembly in a single package.

Other objects and advantages of the present invention will become apparent in the light of the following description.

In general, the oral examiner, in accordance with the present invention, comprises a comparatively flat, wide, elongated body portion, having ends set at angles to the longitudinal dimension of the main body and with mirrors set in said angular end portions, and with slots and indents or detents located in the main body.

The main body portion and the end portions constitute preferably one unitary integral piece of elastic plastic material such as Teflon or polypropylene plastic. In the preferred embodiment a mirror is set at each end, one being larger, i.e., of a size adapted for inspection of the lower tracheal area, the other mirror being smaller and adapted primarily for reflecting an image of the upper laryngeal tract.

The main body portion is relatively wide and flat whereby the instrument may be used as a retractor or tongue depressor while simultaneously being used as a mirror for visual inspection.

If desired, only one mirror may be installed in the instrument, but the instrument is more versatile when two mirrors of different sizes are employed. The mirrors normally will be circular flats set in recesses in the angular ends of the device. One mode of construction involves conforming the recess to the size of the mirror, i. making the mirror fit closely so that it can be insert and removed by flexing the recess, thus being repla( able. There will be advantages, however, in permanen sealing the mirrors in place, as by heating in an au clave or other conventional method.

Whereas in the appended claims the invention is ( fined with particularity, in order that same may be bet understood one embodiment of the invention is here after illustrated and described.

Figure 1:
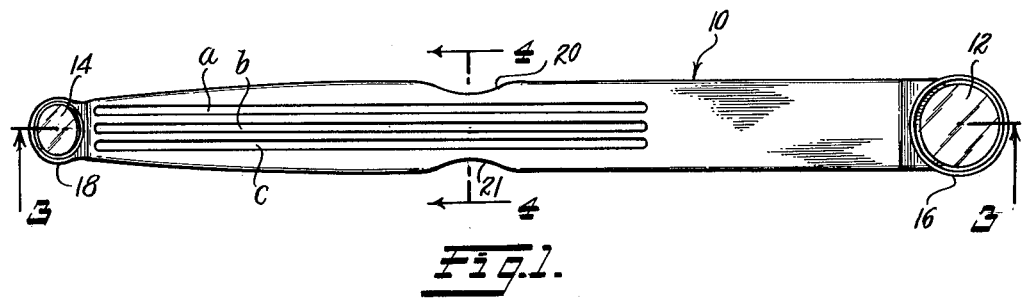
FIG. 1 is a plan view of one embodiment of the inve tion.
Figure 2:
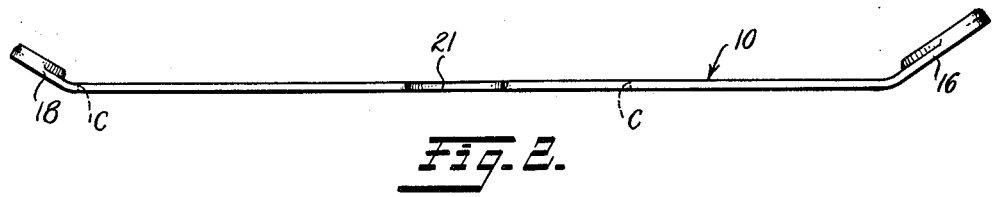
FIG. 2 is a side view of the instrument shown FIG. 1.
Figure 3:
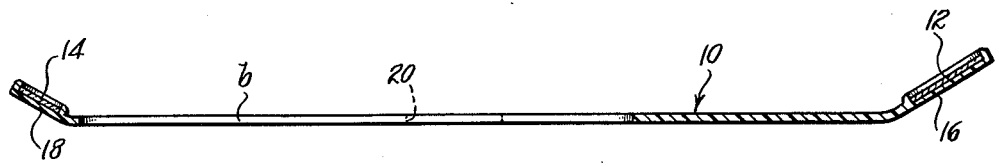
FIG. 3 is a sectional view of the instrument taken alo line 3—3 of FIG. 1.
Figure 4:
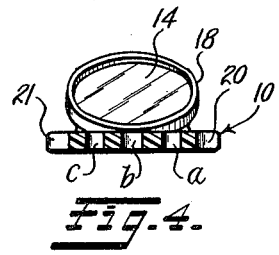
FIG. 4 is an enlarged sectional view taken along t line 4—4 of FIG. 1.

Referring now to the drawings, the main body porti( 10 consists of a flat elongated shank of spatula-li shape, having upturned ends with mirrors 12 and 14 cessed therein. The end portions 16 and 18 respectiv ly are set at an angle to the main body or elongat portion 10. The angular end portions 16 and 18 cons tute integral extensions of the main body portion 1 The end portion 16 is shown as having a larger ar than the end portion 18, and the mirrors 12 and 14 spectively are of corresponding respective dimensions.

In the illustrated device the body portion and t end portions are formed of a single integral piece plastic. The plastic material itself is a matter of choi inasmuch as there are a vast number of available plast materials which would be suitable. It is necessary on that the plastic material should be flexible and/or elast i.e., it is contemplated to form the plastic body and en of a material which can be bent at will, thereupon eith permanently assuming the shape imparted or, preferabl being elastic and returning immediately to its origin shape after release of the deforming force. In eith event, the object is to facilitate the use of the instrume by the physician or dentist or other person using it. T preferred plastic material would be transparent, althou the use of color is not excluded.

In furtherance of the aforesaid described purpose, the are formed in the body 10 three slots, a, b, and c. The elongated slots render the examiner more flexible ar better adapted to conform to the configuration of tl tongue, gums, teeth, larynx and other parts of the or cavity. In brief, the aforesaid slots provide the instr ment with a multidirectional predetermined flexibilty.

As further means to assist in the operation of tl instrument according to the present invention, there a provided two indents or detents in the edges of tl body portion. In the present drawing these are show as a pair of indents, 20 and 21. Otherwise, for exampl the said gripping means may amount to slight outwai bulges (not illustrated) along the outer edge of the bod portion.

Whereas, for purposes of illustration, there have bee shown two indents and three slots, it will be clear] seen that the concept of the invention is not confined either the number of slots or indentations and is n limited to any particular size or shape thereof or of tl instrument or any parts thereof. For certain sizes an purposes, one or two slots only might be provided, an for others more than three slots could serve the pu pose, even though less effectively.

Likewise, it will be understood that whereas in tl disclosed preferred embodiment there are shown tw end mirrors, the device would be useful if a mirrc were provided at one end only.

preferably, the slots are parallel and are formed closer [to] the end of the instrument than the other (FIG. 1).

[W]hat I claim and desire to protect by Letters Patent [is as] follows:

[1.] An oral examiner comprising a body portion, two [mirr]ors mounted therein, said body portion being elon[gate], being formed of thin flexible material, and having [mult]idirectional flexibility, said body being provided with [two] end areas set at an angle to the longitudinal dimen[sion] of said elongated body portion, said mirrors being mounted within said end portions, said body portion [bein]g provided with a plurality of longitudinal slots.

[2.] An oral examiner comprising a body portion, a [mirr]or therein, said body portion being elongate, being [form]ed of thin flexible material, and having multidirec[tiona]l flexibility, said body being provided with at least [one] end area set at an angle to the longitudinal direction [of sa]id elongate body portion, said mirror being mounted [with]in said end area, said body portion being provided [with] a plurality of longitudinal slots.

[3.] An oral examiner according to claim 2 wherein said [body] portion is formed of plastic material.

[4.] An oral examiner according to claim 2 wherein [said] body portion is provided with gripping indents [alon]g the edges of said body portion.

[5.] An oral examiner according to claim 2 wherein [said] mirror is detachably mounted in said end area.

[6.] An oral examiner according to claim 2 wherein [said] mirror is sealed in said end area.

[7.] An oral examiner comprising a body portion, a [mirr]or therein, said body portion being elongate, being [form]ed of thin resilient material, and having multidirec[tiona]l flexibility; and being provided with a plurality [of l]ongitudinal slots to further impart multidirectional [flexi]bility to said body portion.

8. An oral examiner comprising a body portion, a mirror therein, said body portion being elongate, being formed of thin resilient material, and having multidirectional flexibility; and being provided with a plurality of longitudinal slots to further impart multidirectional flexibility to said body portion, said slots extending from approximately one end of said elongate body portion and toward the opposite end of said body portion for a distance less than the full length of said body portion.

9. An oral examiner comprising a body portion, a mirror therein, said body portion being elongate, being formed of thin resilient material, and having multidirectional flexibility; and being provided with a plurality of longitudinal slots to further impart multidirectional flexibility to said body portion, said slots extending from approximately one end of said elongate body portion and toward the opposite end of said body portion for a distance more than half of the full length of said body portion.

References Cited in the file of this patent

UNITED STATES PATENTS

| | | |
|---|---|---|
| 1,029,258 | Beadles | June 11, 1912 |
| 1,473,357 | Pletman | Nov. 6, 1923 |
| 1,506,401 | Young | Aug. 26, 1924 |
| 1,844,733 | Wise | Feb. 9, 1932 |
| 2,653,597 | Canan | Sept. 29, 1953 |
| 3,082,762 | Gnehm | Mar. 26, 1963 |

OTHER REFERENCES

Mueller Catalog, V. Mueller & Co. of Chicago, 1938 Catalog, page 120.